No. 719,426. PATENTED FEB. 3, 1903.
W. C. BOONE.
EXPANSION BOLT.
APPLICATION FILED APR. 18, 1902.
NO MODEL.
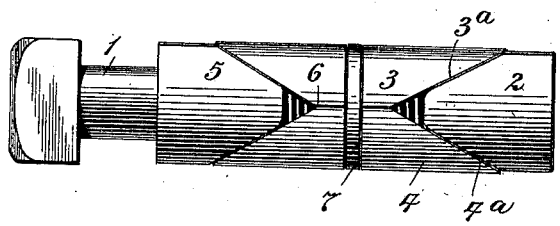
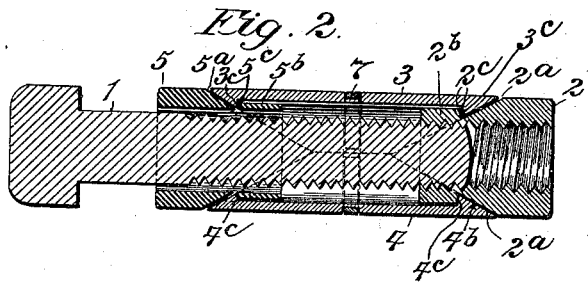
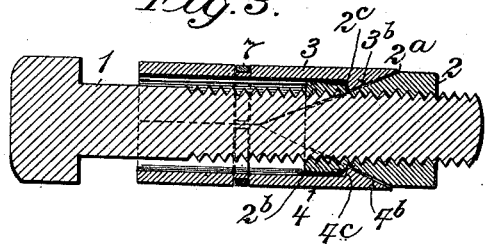
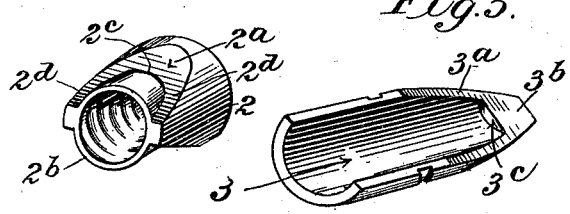

UNITED STATES PATENT OFFICE.

WILLIAM C. BOONE, OF NEW YORK, N. Y.

EXPANSION-BOLT.

SPECIFICATION forming part of Letters Patent No. 719,426, dated February 3, 1903.

Application filed April 18, 1902. Serial No. 103,518. (No model.)

*To all whom it may concern:*

Be it known that I, WILLIAM C. BOONE, a citizen of the United States, and a resident of New York city, borough of Richmond, State of New York, have invented certain new and useful Improvements in Expansion-Bolts, of which the following is a specification.

My invention relates to improvements in what are commonly called "expansion-bolts;" and the objects of my invention are to provide improved means for causing the cover portions or outer members of the bolt to expand or separate and for holding the members together when being handled or inserted in a hole.

The invention comprises the novel details of improvement that will be more fully hereinafter set forth and then pointed out in the claims.

Reference is to be had to the accompanying drawings, forming part hereof, wherein—

Figure 1 is a side view of an expansion-bolt embodying my invention, illustrating what is commonly called a "double-expansion" bolt. Fig. 2 is a central longitudinal section thereof. Fig. 3 is a similar view of a "single-expansion" bolt. Fig. 4 is a perspective view of the nut portion of the bolt, and Fig. 5 is a detail of the cover portion of the bolt.

In the accompanying drawings similar numerals of reference indicate corresponding parts in the several views.

In the accompanying drawings the numeral 1 indicates a screw, threaded bolt, or the like. 2 is a nut having internal threads to be engaged by the threads of said screw or bolt, and 3 4 are covers or expansion members of the expansion-bolt.

In Figs. 1 and 2 the device is provided with a collar or sleeve 5, through which the bolt 1 is adapted to pass freely, providing a double-expansion bolt.

One or both ends of the covers or members 3 4 are beveled or tapered outwardly at $3^a$ $4^a$, as clearly shown in Fig. 1. When the covers 3 4 are placed together in position around the bolt 1, said covers form a hollow body provided with a cylindrical bore. The two covers or members 3 4 preferably have meeting edges at 6 and are held together around the bolt 1 by an elastic band 7, shown located in annular grooves of said members.

The nut 2 is wedge-shaped at one end—that is to say, its opposite surfaces at $2^a$ are inclined or tapered inwardly—forming bearing-surfaces for the tapered or inclined ends of the covers or members 3 4 to bear upon, and at the inner end the nut 2 has an annular boss or cylindrical portion $2^b$, which fits within the bore of the covers 3 4 and serves as a guide. The outer walls of the boss $2^b$ merge with the inclined or beveled surfaces $2^a$ of the nut 2, and the inner end of the boss $2^b$ is of such diameter where it meets the inclines $2^a$ as to extend outwardly therefrom at $2^c$, forming shoulders or abutments, the inclined or wedge-shaped portions of the nut 2 on the opposite sides at $2^d$ extending along the boss $2^b$, as clearly shown in Fig. 4. The covers or members 3 4 at one or both ends (according to whether a single-expansion or double-expansion bolt is intended) are provided with internal centrally-disposed beveled or inclined faces $3^b$ $4^b$, which correspond to and overlie the inclines or bevels $2^a$ of the nut and coincide therewith, as shown in Figs. 2 and 3. The inner ends of the inclined portions $3^b$ $4^b$ project inwardly from the plane of the wall of the bore of the covers or expansion members, forming shoulders or abutments adapted to engage the shoulders or abutments $2^c$ on the nut, whereby when the parts are assembled, as in Figs. 2 and 3, the nut is held in position between the ends of the covers 3 4 to prevent the nut from becoming detached from the covers. The inclined sides $3^a$ $4^a$ of the covers or expansion members correspond to the inclines $2^d$ of the nut 2 and bear thereon.

In the double-expansion bolt, as illustrated in Figs. 1 and 2, the collar 5 is provided with inclines $5^a$ and boss $5^b$, having shoulders $5^c$, all substantially as shown with respect to the nut 2 and coacting with the corresponding inclined portions of the covers 3 4 and the shoulders $3^c$ $4^c$ in similar manner. In the single-expansion bolt (shown in Fig. 3) the collar 5 and the correspondingly-shaped ends of the covers 3 4 are omitted.

The parts of the double-expansion bolt being assembled, as in Figs. 1 and 2, the bolt and the members will all remain united together in handling and in being passed into a hole. When using the bolt, the same is passed into a hole and the threaded member 1 is rotated, and thereupon when the collar 5 meets an abutment the nut 2 and the collar 5 being drawn toward each other will cause the covers 3 4 to expand, owing to the sliding of the inclines or wedges of the nut and collar within the correspondingly-beveled inner surfaces or edges of the covers, and as the ends of the covers bear upon the correspondingly-inclined portions of the nut and collar a firm and relatively large bearing is provided at the extreme ends of the covers, as well as along the edges $3^a$ $4^a$ thereof. With the single-expansion bolt (illustrated in Fig. 3) when the bolt is placed in the hole and the ends of the covers opposite the nut 2 bear against an abutment and the screw is rotated the nut 2 will slide between the covers, causing them to expand, as before indicated.

Having now described my invention, what I claim is—

1. An expansion-bolt comprising concavo-convex-shaped covers having inclined edges near their ends, and inclined inner faces near their ends between said edges extending on the plane of said edges and merging therewith, said faces extending inwardly from the inner walls of the covers forming shoulders, a nut having inclined surfaces on opposite sides upon which the inclined faces of the covers bear and slide, the nut being provided with shoulders at the inner ends of its inclined surfaces and a threaded member to engage the threads of the nut, substantially as described.

2. An expansion-bolt comprising concavo-convex-shaped covers having outwardly-inclined inner flat faces $3^b$ at their ends extending inwardly of the curved inner surfaces of the covers forming shoulders $3^c$ at the inner edges of said faces, a nut having inclined surfaces $2^a$ on opposite sides to engage the inclined faces $3^b$ of the covers, said nut having an annular boss $2^b$ at its inner end extending laterally beyond the inner edges of the inclined surfaces $2^a$ providing shoulders $2^c$ at said inner edges of said inclined surfaces to engage the shoulders $3^c$ on the covers, the inclines $2^d$ of the nut extending along the boss, said boss being of a diameter to fit within the bore of the covers to serve as a guide, and a threaded member to engage the threads in the nut, substantially as described.

WILLIAM C. BOONE.

Witnesses:
GEORGE W. LISK,
HERBERT TRUKHAEW.